Figure 1:
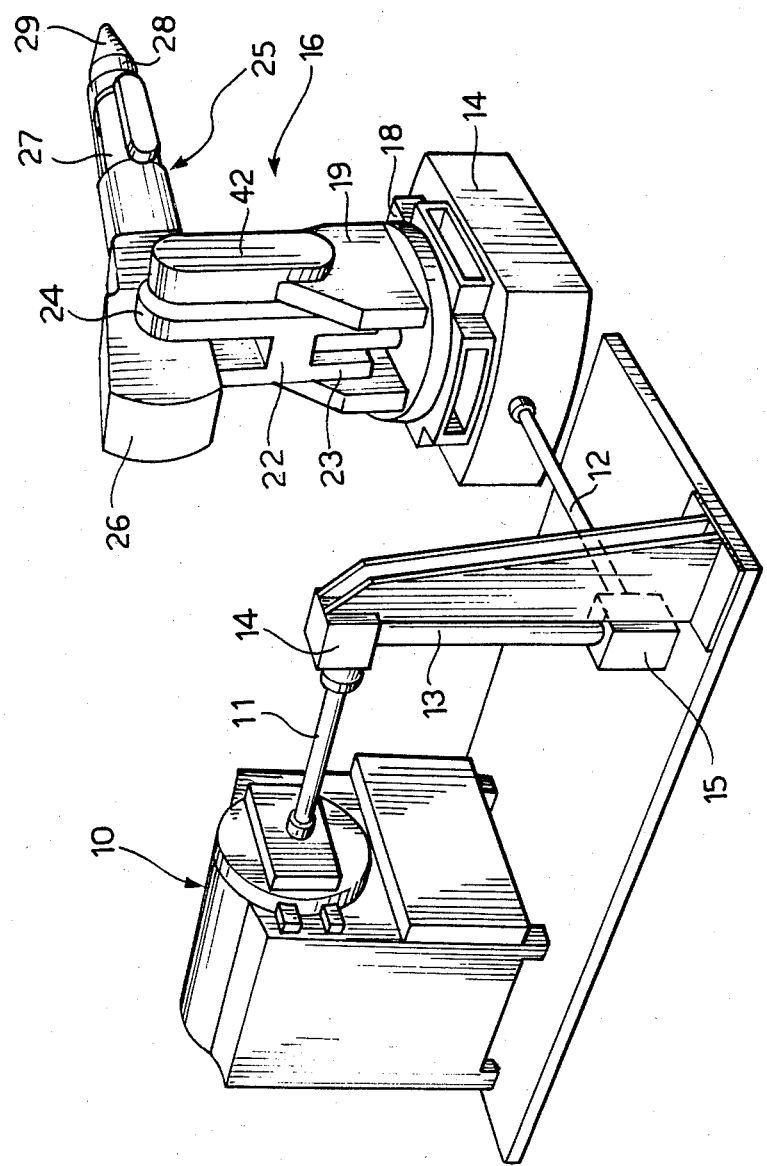

United States Patent [19]
Marinoni et al.

[11] Patent Number: 4,698,483
[45] Date of Patent: Oct. 6, 1987

[54] INDUSTRIAL ROBOT FOR WELDING AND CUTTING BY MEANS OF A LASER BEAM

[75] Inventors: Giorgio Marinoni; Giuseppe Capello, both of Turin, Italy

[73] Assignee: Comau S.p.A., Grugliasco, Italy

[21] Appl. No.: 935,497

[22] Filed: Nov. 26, 1986

[30] Foreign Application Priority Data

Nov. 26, 1985 [IT] Italy .............................. 54093/85[U]

[51] Int. Cl.$^4$ ............................................. B23K 26/00
[52] U.S. Cl. ...................... 219/121 LU; 219/121 LC; 219/121 LG
[58] Field of Search ................. 219/121 LC, 121 LD, 219/121 LG, 121 LN, 121 LU, 121 LV; 350/632, 631, 616–618, 639; 901/47, 42

[56] References Cited

U.S. PATENT DOCUMENTS

| 4,563,567 | 1/1986 | Geffroy et al. | 219/121 LU |
| 4,626,649 | 12/1986 | Dupeyrat et al. | 219/121 LU |
| 4,638,143 | 1/1987 | Akeel | 219/121 LU |
| 4,650,952 | 3/1987 | Akeel | 219/121 LU |

FOREIGN PATENT DOCUMENTS

| 0137588 | 7/1985 | Japan | 219/121 LQ |
| 2131388 | 6/1984 | United Kingdom | 219/121 LU |

*Primary Examiner*—C. L. Albritton
*Attorney, Agent, or Firm*—Sughrue, Mion, Zinn, Macpeak, and Seas

[57] ABSTRACT

An industrial robot with five degrees of freedom comprises a plurality of mirrors and internal ducts for guiding a laser beam intended for use in welding or cutting metal parts. The laser guide system is intended for installation with the minimum of adaptation on industrial robots used, for example, for resistance welding.

4 Claims, 5 Drawing Figures

INDUSTRIAL ROBOT FOR WELDING AND CUTTING BY MEANS OF A LASER BEAM

The present invention relates to an industrial robot for welding and cutting by means of a laser beam, of the type comprising a base, a fork element supported vertically and rotatably by the base, an arm articulated at its first end to the fork element about a substantially horizontal axis, a forearm articulated to a second end of the arm about a substantially horizontal axis, a wrist assembly mounted at the unarticulated end of the forearm, rotatable about an axis parallel to the forearm and having an end portion which supports a lens for focusing the laser beam and is rotatable about an axis substantially perpendicular to the axis of rotation of the wrist assembly, control means for rotating the fork element, the arm, the forearm, the wrist assembly and its end portion, respectively, and means for guiding the laser beam inside the robot.

Robots of the type defined above have been constructed according to the particular application of welding and cutting by means of a laser beam. This has required considerable investment for designing new robots, or at least for the radical conversion of existing robots.

The object of the present invention is to provide a robot for welding and cutting by means of a laser beam, which does not exhibit the above-mentioned disadvantage since it is the result of a relatively simple conversion of a conventional robot, for example, a robot used for electric resistance welding.

The object of the present invention is achieved in that the means for guiding the laser beam comprise a horizontal duct formed in a base plate located above the base, having a first end disposed in correspondence with the thickness of the plate and a second end disposed centrally in correspondence with the vertical axis of the fork element; a first mirror supported by the base plate in correspondence with the second end of the horizontal duct, for deflecting the laser beam coming from the external source from a horizontal direction to a vertical direction; a tubular element supported by the base plate and disposed vertically and coaxially with the fork element so that it serves to guide the beam from the first mirror to the axis of rotation of the arm relative to the fork element; a second mirror disposed in correspondence with the axis of rotation of the arm relative to the fork element and positioned substantially centrally between the two ends of the element, for deflecting the laser beam from the vertical direction to a horizontal direction coaxial with the axis of rotation; a protective case for the laser beam, supported laterally by the arm; a third mirror supported by the case, and arranged on the axis of rotation of the arm relative to the fork element, externally relative to the end of the element, this mirror being intended to deflect the laser beam from the direction coaxial with the axis of rotation to a direction parallel to the arm, inside the protective case; a fourth mirror supported by the case and disposed on the axis of rotation of the forearm relative to the arm, for deflecting the laser beam from the direction parallel to the arm to a direction coaxial with the axis of rotation of the forearm relative to the arm; a fifth mirror supported by the forearm on the axis of rotation of the latter relative to the arm, this mirror being intended to deflect the laser beam from the direction coaxial with the axis of rotation of the forearm relative to the arm to a direction parallel to the forearm and coaxial with the axis of rotation of the wrist assembly; and an assembly of four mirrors inside the wrist assembly for deflecting the laser beam in a direction perpendicular to the axis of rotation of the wrist assembly, parallel to the said axis, again perpendicular to the axis coaxial with the axis of rotation of the end portion of the wrist assembly, and finally in a direction coaxial with the focusing lens for the laser beam, respectively.

Figure 2:
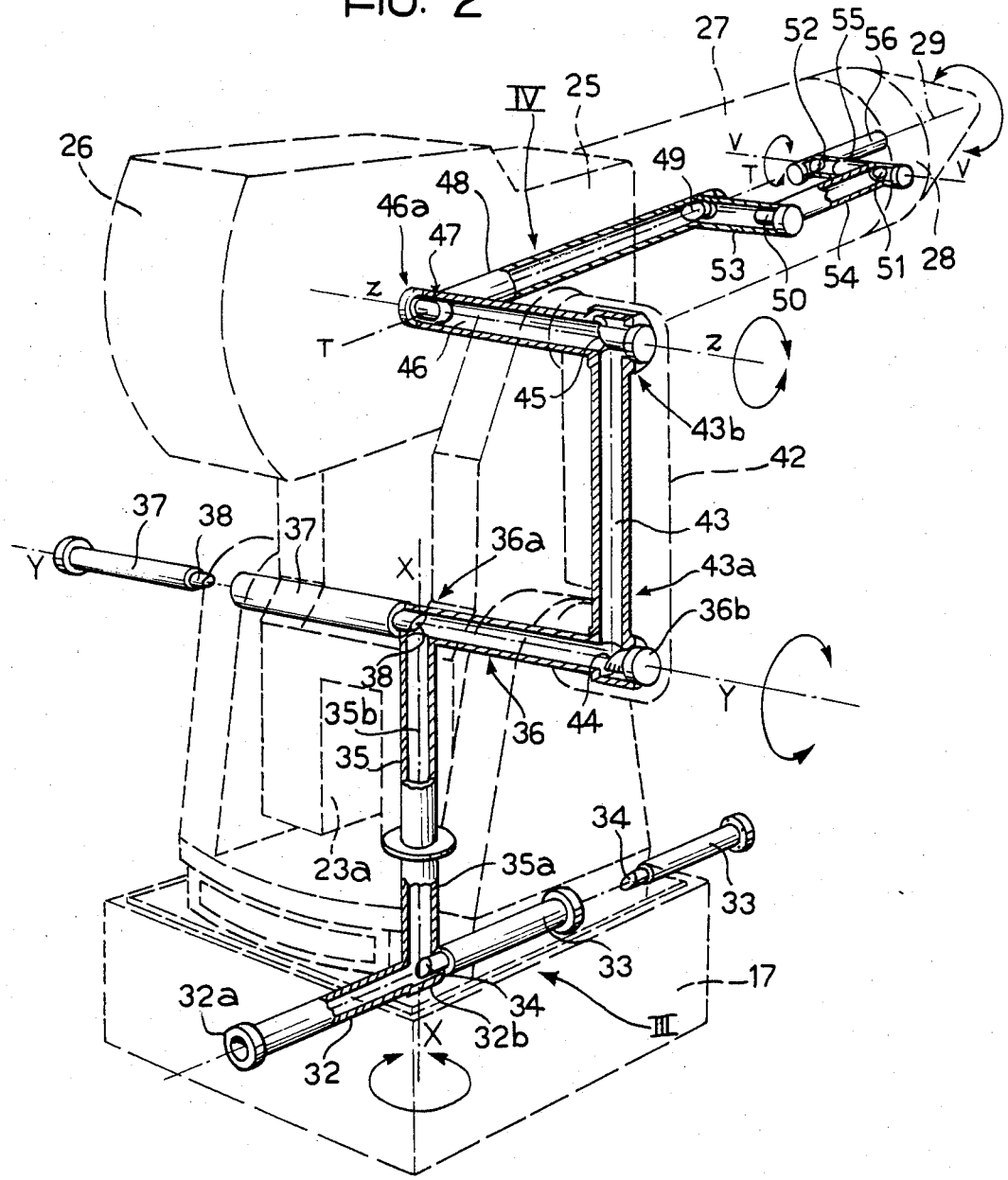
Figure 3:
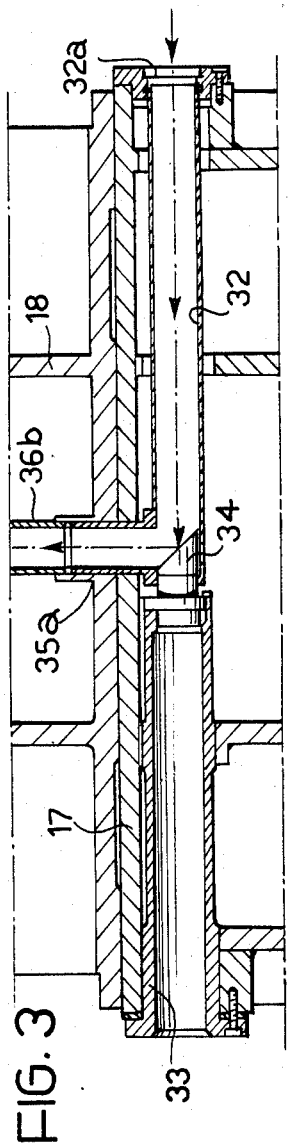
Figure 5:
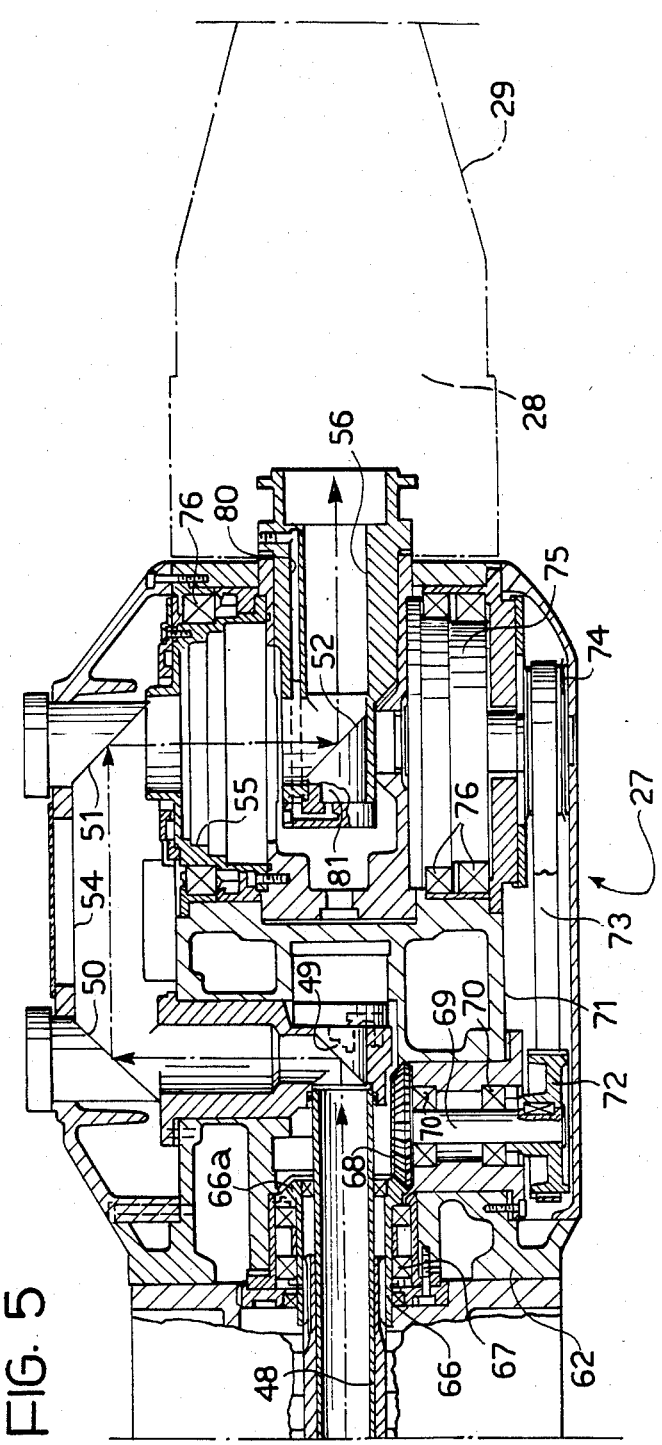
Figure 4:
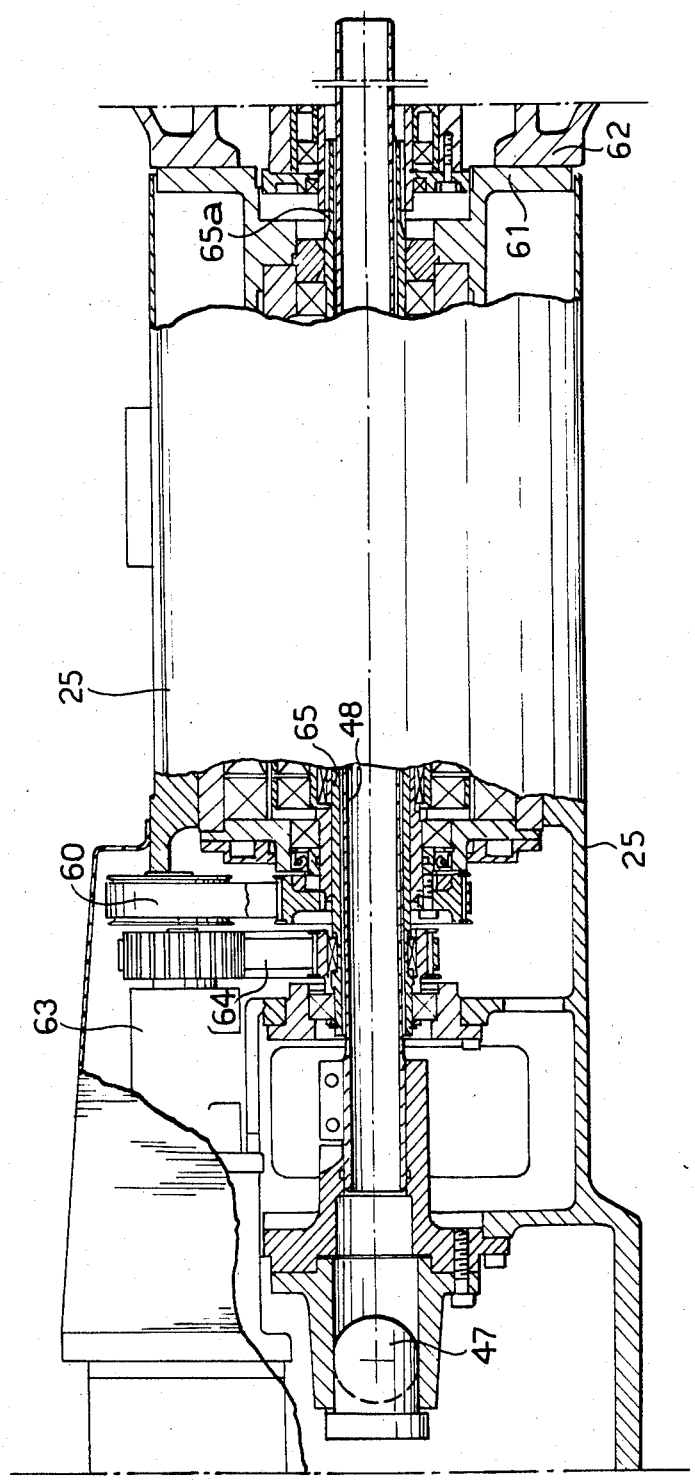

Further advantages and characteristics of the robot according to the present invention will be evident from the following detailed description provided purely by way of non-limiting example, with reference to the appended drawings, in which:

FIG. 1 is a perspective view of the robot and the related source of supply of the laser beam, FIG. 2 is a diagrammatic perspective view which illustrates the path of the laser beam inside the robot, FIG. 3 is a sectional view of a detail of FIG. 2, FIG. 4 is a sectional view of a detail of FIG. 2, and FIG. 5 is a sectional view of a detail of FIG. 2.

With reference to the drawings, by 10 is indicated a laser source which, via horizontal ducts 11 and 12, a vertical duct 13, and mirrors 14 and 15, supplies a robot 16 for welding and cutting by means of a laser beam. The robot 16, for example of the Smart type manufactured and sold by the Applicant, comprises a base plate 17, a base 18 located above the plate 17, and a fork element 19 supported for rotation about a vertical axis, indicated X—X, by the base 18. An arm 22 comprising a counterweight 23 and a forked end 24 is articulated to the fork element 19. The axis of rotation of the arm 22 relative to the fork element 19 is indicated X—X in the drawings.

A forearm 25, which is provided with a counterweight 26 and a wrist 27 rotating coaxially with the forearm 25 about an axis T—T, is articulated to the end 24 of arm 22 about a horizontal axis Z—Z. The wrist 27 includes an end 28 carrying a focusing cone 29 and rotatable about an axis V—V perpendicular to axis of rotation T—T of wrist 27. For further details regarding the structure and control means of the robot from which the robot of the present invention originates, reference is made to the existing literature on the subject, and particularly to the documentation relating to the Smart robot manufactured by the Applicant, insofar as such details depart from the subject of the present invention.

In the base plate 17 is formed a horizontal duct 32 having an end 32a in correspondence with the thickness of the plate 17 and an end 32b substantially in correspondence with the centre of the plate. An extension of the duct 32 is provided with a seat for a cylindrical support element 33 carrying a mirror 34 which, in the operative position, is in correspondence with the end 32b of the duct 32. In FIG. 2, the element 33 is shown in both its inserted configuration in the plate 17 and in its withdrawn configuration. A duct 35 is installed in correspondence with the vertical axis X—X and comprises a section 35a supported by the base plate 17 and a section 35b supported by the fork element 19 and rotatable with the latter about the axis X—X.

A horizontal duct 36, having an end 36a in correspondence with the axis X—X and an end 36b outside the end of the fork element 19, is installed in correspondence with the pivot for articulation of the arm 22 relative to the fork element 19. A mirror 38, supported by a cylindrical element 37 removable from the connecting pin between the element 19 and the arm 22, is installed in correspondence with the end 36a of duct 36. In FIG. 2, the cylindrical element 37 is illustrated in both its removed configuration and its operative configuration. The cylindrical support element 37 and the cylindrical element 33 can be rotated about their axes to allow adjustment of the mirrors 38 and 34, respectively.

The arm 22 supports laterally a case 42 housing a duct 43 for the laser beam. The duct 43 has an end 43 in correspondence with the axis of rotation Y—Y, and an end 43b in correspondence with the axis of rotation Z—Z. The case supports mirrors 44 and 45 in correspondence with the ends 43a and 43b of the duct 43, respectively.

A duct 46 is mounted in correspondence with the articulation pin of the forearm 25 relative to the end 24 of the arm 22, coaxially with the axis of rotation Z—Z. The duct 46 has an end 46a which is disposed on the axis of rotation T—T of the wrist 27. A mirror 47, for deflecting the laser beam into a duct 48 coaxial with the axis T—T, is mounted in correspondence with the end 46a.

Four mirrors 49, 50, 51, 52 interconnected by respective ducts 53, 54 and 55 are installed in correspondence with the wrist 27. The mirror 52 rotates with the end portion 28 of the wrist 27 about the axis of rotation V—V, enabling the laser beam to be guided in a duct 56 towards the focusing lens (not illustrated) within the cone 29.

FIG. 4 shows a detail of the forearm 25 and illustrates the transmission of motion to the wrist 27 and its end portion 28. The transmission of the motion for rotating the wrist 27 about the axis T—T is provided by a toothed belt drive 60 which transmits the motion, coaxially with the duct 48, to a flange 61 connected to an end flange 62 of the wrist 27.

The pivoting of the end 28 of the wrist 27 about the axis V—V is effected by means of a geared motor 63, a toothed belt drive 64, and a hollow shaft 65 mounted coaxially on the outside of the duct 48. The hollow shaft 65 has a splined end 65a for transmitting the rotary motion to a tubular element 66 supported, by means of rolling bearings 67, by the structure 71 of the wrist 27. At one of its ends, the tubular element 66 has a ring bevel gear 66a which engages a corresponding ring bevel gear 68 attached to a transmission shaft 69 supported rotatably, by means of rolling bearings 70, by the structure 71 to which the flange 62 is secured. A toothed pulley 72 is secured to the shaft 69 and is intended to transmit the motion, through a toothed belt 73, to a driven pulley 74 which, by means of a reducer 75 and rolling bearings 76, rotates the end 28 of the wrist 27 about the axis V—V.

A path for the laser beam is formed in the structure 71 on the side opposite the toothed belt 73, which, in a conventional robot and particularly in a robot of the Smart type, is occupied by the gears and belt drive for transmitting motion from a shaft coaxial with the hollow shaft 65 to a shaft corresponding to the end 28 of the wrist 27 to provide a further degree of freedom for the tool carried by a conventional robot. In the case of the robot according to the present invention, the rotation of the laser beam about its own axis does not afford any advantage; this has therefore enabled the elimination of the shaft coaxial with the hollow shaft 65, the related motorization and the entire drive transmission within the wrist 27, in order to to provide the space required for the path of the laser beam. The conversion of the conventional Smart robot to a robot for welding and cutting by means of a laser beam therefore requires a limited number of operations which comprise essentially, in addition to the arrangement of the ducts for guiding the beam, the arrangement of the base plate 17 above the base 18, the creation of a slot 23a in the counterweight 23 to allow the installation of the duct 35, the installation of a case 43 laterally of the arm 22, and the removal of the motorization and related drive transmission for a sixth degree of freedom no longer required.

All the mirrors of the robot according to the present invention are subject to liquid cooling to prevent them from overheating during operation. FIG. 5 shows, by way of example, the cooling system for the mirror 52, comprising a pipe 80 which conveys the coolant to a chamber 81 behind the mirror.

Moreover, the entire path of the laser beam along the ducts to the focusing lens is kept gas-tight to prevent the ingress of dust or moisture, and to allow the admission of pretreated air.

The scope of the present invention is intended to extend to models which achieve equal utility using the same innovative concept.

What is claimed is:

1. An industrial robot for welding and cutting by means of a laser beam from an external source, of the type comprising:

a laser source,
   a base,
   a fork element supported by the base for rotation about a vertical axis,
   an arm articulated at its first end to the said element about a substantially horizontal axis,
   a forearm articulated to a second end of the arm about a substantially horizontal axis,
   a wrist assembly fitted to the unarticulated end of the forearm, rotatable about an axis parallel to the forearm and having an end portion rotatable about an axis substantially perpendicular to the axis of rotation of the wrist assembly,
   a lens for focusing the laser beam, supported by said end portion,
   control means for rotating the fork element, the arm, the forearm, the wrist assembly and its end portion, respectively, and
   means for guiding the laser beam inside the robot, wherein said guide means comprise:
   a base plate located above the base,
   a horizontal duct formed in the base plate and having a first end (32a) disposed in correspondence with the thickness of the plate and a second end disposed centrally in correspondence with the vertical axis of the fork element,
   a first mirror supported by the base plate in correspondence with the second end of the horizontal duct, for deflecting the laser beam from a horizontal direction to a vertical direction,
   a tubular element disposed vertically and coaxially with the axis of rotation of the fork element, so that it serves to guide the beam from the first mirror to the axis of rotation of the arm relative to the fork element,
   a second mirror disposed in correspondence with the axis of rotation of the arm relative to the fork element, for deflecting the beam from the vertical direction to a horizontal direction coaxial with the axis of rotation, a protective case for the laser beam, supported laterally by the arm, a third mirror supported by the case and disposed on the axis of rotation of the arm relative to the fork element, externally relative to the end of the fork element, this mirror being intended to deflect the laser beam from the direction coaxial with the axis of rotation to a direction parallel to the arm, inside the protective case, a fourth mirror supported by the case and disposed on the axis of rotation of the forearm relative to the arm, for deflecting the laser beam from the direction parallel to the arm to a direction coaxial with the axis of rotation of the forearm relative to the arm, a fifth mirror supported by the forearm on the axis of rotation of the latter relative to the arm, this mirror being intended to deflect the laser beam from the direction coaxial with the axis of rotation of the forearm relative to the arm to a direction parallel to the forearm and coaxial with the axis of rotation of the wrist assembly, and an assembly of four mirrors inside the wrist assembly for deflecting the laser beam in a direction perpendicular to the axis of rotation of the wrist assembly, parallel to the said axis, again perpendicular to the axis coaxial with the axis of rotation of the end portion of the wrist assembly, and finally in a direction coaxial with the focussing lens for the laser beam, respectively.

2. Robot according to claim 1, wherein the path of the laser beam inside the robot is gas-tight.

3. Robot according to claim 1, wherein the first mirror is supported by a cylindrical element removable from the base plate, this element being located on an extension of the horizontal duct of the plate and being rotatable about its own axis to adjust the position of the mirror.

4. Robot according to claim 1, wherein the second mirror is supported by a cylindrical element located inside the pivot for rotation between the two ends of the fork element, this element being removable from the pivot and rotatable about its own axis to adjust the position of the mirror.

* * * * *